US007840286B2

(12) United States Patent
Caldwell et al.

(10) Patent No.: US 7,840,286 B2
(45) Date of Patent: *Nov. 23, 2010

(54) INTELLIGENT SHELVING SYSTEM

(75) Inventors: David W. Caldwell, Holland, MI (US); Thomas M. Schreiber, Wheaton, IL (US); Bahar N. Wadia, Bartlett, IL (US); Donald C. Mueller, Aurora, IL (US)

(73) Assignee: TouchSensor Technologies, LLC, Wheaton, IL (US)

( * ) Notice: Subject to any disclaimer, the term of this patent is extended or adjusted under 35 U.S.C. 154(b) by 540 days.

This patent is subject to a terminal disclaimer.

(21) Appl. No.: 11/544,323

(22) Filed: Oct. 6, 2006

(65) Prior Publication Data

US 2007/0156261 A1 Jul. 5, 2007

Related U.S. Application Data

(63) Continuation-in-part of application No. 10/271,933, filed on Oct. 15, 2002, now Pat. No. 7,260,438.

(60) Provisional application No. 60/334,040, filed on Nov. 20, 2001, provisional application No. 60/341,350, filed on Dec. 18, 2001, provisional application No. 60/341,550, filed on Dec. 18, 2001, provisional application No. 60/341,551, filed on Dec. 18, 2001, provisional application No. 60/388,245, filed on Jun. 13, 2002, provisional application No. 60/724,089, filed on Oct. 6, 2005.

(51) Int. Cl.
*G05B 11/01* (2006.01)
*G05B 15/00* (2006.01)

(52) U.S. Cl. .......................................... 700/17; 700/83

(58) Field of Classification Search .................. 700/17, 700/83

See application file for complete search history.

(56) References Cited

U.S. PATENT DOCUMENTS

| | | | | | |
|---|---|---|---|---|---|
| 3,316,044 | A | | 4/1967 | Carbary | |
| 3,572,049 | A | | 9/1969 | Moorman | |
| 3,982,801 | A | * | 9/1976 | Heidorn et al. | 312/306 |
| 3,984,163 | A | * | 10/1976 | Boorman et al. | 312/408 |
| 5,019,811 | A | * | 5/1991 | Olsson et al. | 340/5.91 |
| 5,160,190 | A | * | 11/1992 | Farrell et al. | 312/201 |
| 5,199,778 | A | * | 4/1993 | Aoki et al. | 312/408 |

(Continued)

FOREIGN PATENT DOCUMENTS

EP 1079511 2/2001

(Continued)

OTHER PUBLICATIONS

Written Opinion of the International Searching Authority (Form PCT/ISA/237).

(Continued)

*Primary Examiner*—Ronald D Hartman, Jr.
(74) *Attorney, Agent, or Firm*—Barnes & Thornburg LLP

(57) ABSTRACT

An intelligent shelving system integrates touch sensors, displays, lighting, and other components into shelves. Touch sensors can be used as limit switches to control shelf motion, to monitor items borne on shelves, to detect spills, and to control lighting and other devices and functions. Displays can provide information relating to objects stored in the shelving system and the operation and status of the shelving system.

21 Claims, 8 Drawing Sheets

U.S. PATENT DOCUMENTS

| | | | | | |
|---|---|---|---|---|---|
| 5,287,252 | A | * | 2/1994 | Caruso | 362/92 |
| 5,429,043 | A | | 7/1995 | Becker | |
| 5,594,222 | A | | 1/1997 | Caldwell | |
| 5,856,646 | A | | 1/1999 | Simon | |
| 5,913,584 | A | | 6/1999 | Swindell et al. | |
| 6,058,718 | A | | 5/2000 | Forsberg et al. | |
| 6,065,821 | A | | 5/2000 | Anderson et al. | |
| 6,107,928 | A | * | 8/2000 | Gatti | 340/686.1 |
| 6,204,763 | B1 | | 3/2001 | Sone | |
| 6,310,611 | B1 | | 10/2001 | Caldwell | |
| 6,320,282 | B1 | | 11/2001 | Caldwell | |
| 6,698,222 | B2 | * | 3/2004 | Sanna et al. | 62/229 |
| 6,786,652 | B2 | * | 9/2004 | Marquez et al. | 385/92 |
| 6,813,896 | B1 | * | 11/2004 | Janke et al. | 62/126 |
| 6,897,390 | B2 | | 5/2005 | Caldwell et al. | |
| 6,919,795 | B2 | * | 7/2005 | Roseen | 340/309.16 |
| 7,260,438 | B2 | * | 8/2007 | Caldwell et al. | 700/60 |
| 2001/0025508 | A1 | | 10/2001 | Nakajima et al. | |
| 2001/0054297 | A1 | | 12/2001 | Credle et al. | |
| 2003/0122432 | A1 | | 7/2003 | Caldwell | |
| 2003/0122794 | A1 | | 7/2003 | Caldwell | |
| 2003/0159910 | A1 | | 8/2003 | Caldwell | |

FOREIGN PATENT DOCUMENTS

| | | | |
|---|---|---|---|
| JP | 04-62133 | U | 5/1992 |
| JP | 05-80532 | U | 11/1993 |
| JP | 09-75150 | A | 3/1997 |
| WO | 03/043464 | A | 5/2003 |

OTHER PUBLICATIONS

Int'l Search Report and Written Opinion issued Feb. 2, 2007, in related application No. WO 2007/041708 (2007).

Office Action issued Nov. 24, 2006, in related application No. CA 2,467,585 (2006).

Office Action issued Dec. 6, 2006, in related application No. EP 02789760.2 (2005).

Office Action issued Dec. 16, 2008, in related application No. JP 2003-545153 (2008).

* cited by examiner

INTELLIGENT SHELVING SYSTEM

CROSS-REFERENCE TO RELATED APPLICATIONS

This application is filed as a continuation-in-part of, claims priority from, and incorporates by reference the disclosure of, U.S. patent application Ser. No. 10/271,933, filed on Oct. 15, 2002, now U.S. Pat. No. 7,260,438, which claims priority from, and incorporates by reference the disclosures of, U.S. Provisional Patent Application Ser. Nos. 60/334,040, filed on Nov. 20, 2001; 60/341,350, 60/341,550, and 60/341,551, all filed on Dec. 18, 2001; and 60/388,245, filed on Jun. 13, 2002. This application also claims priority from, and incorporates by reference the disclosure of, U.S. Provisional Patent Application 60/724,089, filed on Oct. 6, 2005.

BACKGROUND OF THE INVENTION

Shelving systems are commonly used for the efficient display or storage of consumer goods and other items. In their most basic form, shelving systems use fixed (non-adjustable) shelves. Such systems necessarily are designed with sufficient spacing between shelves to accommodate the largest or tallest object expected to be stored therein. A considerable storage volume can be wasted if such a system is used to store items smaller than those considered in establishing the design. Such wasted storage volume could be reduced by reducing the spacing between shelves, but only at the expense of no longer providing capacity to store larger items.

Manually adjustable shelving systems can decrease these inefficiencies by allowing the user to set shelf spacing as necessary for a particular application and to adjust the shelf spacing as needs change. However, manually adjustable systems typically require that items borne on a shelf be removed from the shelf before adjustments can be made. Power operated shelving systems can overcome this problem by allowing the user to adjust shelf spacing on demand, without first clearing a shelf of its contents. However, power operated shelving systems using conventional mechanical switch control interfaces also have limitations. For instance, mechanical switches typically include internal moving parts which are at least somewhat exposed to the environment. As such, contaminants, such as dirt or moisture, can enter the switch mechanism and increase the risk of malfunction or the severity of mechanical wear. Also, the discontinuities and crevices associated with mechanical switches can make such switches and the areas around them difficult to clean.

Further, mechanical switches typically have large profiles, often making it difficult to integrate them into a shelving system where space is limited. For example, mechanical switches typically require a dedicated switch panel which might not easily be integrated into a shelving unit and might even need to be mounted remotely from the shelving unit. Moreover, because mechanical switches generally can control only a single function, a system wherein many functions need to be controlled requires the use of a like number of such switches. Thus, the use of mechanical switches is disadvantageous in shelving systems wherein space conservation is an important consideration.

Conventional shelving systems include numerous other disadvantages. For example, the depth of the shelves in conventional refrigerators and the disparate sizes of products stored thereon can make it cumbersome to take inventory of items in a refrigerator. This task is further complicated by the fact that conventional refrigerators typically use opaque doors, making it impossible to see the contents of the refrigerator without opening the door. As such, taking inventory requires opening the door, a practice that is not only inconvenient, but energy inefficient as well.

Another shortcoming involves illumination of shelving used in, for example, refrigerators. Conventional refrigerators typically include a convenience light somewhere in the interior cavity. Light can propagate from the light fixture, through the wire or glass shelves inside the compartment, to other shelves above or below. Light, however cannot propagate through opaque items placed on such shelves. As such, attempts to illuminate a refrigerator compartment using a single convenience light often achieve very limited success. One proposal to overcome this problem involves the installation of a convenience light under each such shelf for illuminating the space below. Although this solution helps put light where it is needed, a conventional light fixture mounted underneath a refrigerator shelf in a conventional manner is highly susceptible to failure due to infiltration by spilled liquids.

SUMMARY OF THE INVENTION

The present invention overcomes the foregoing limitations and provides an intelligent shelving system that permits efficient use of space by integrating touch sensor technology into power-operated shelving system design. A shelving system according to the present invention can include power-operated shelf adjustment and can incorporate spill detection, adaptive and intelligent operator/equipment interfacing, encapsulated lighting and other features as further described and claimed below.

Although many types of switching devices can be used as control inputs in accordance with the invention, preferred embodiments of the invention use touch input devices that respond to a user's touch or proximity for control input. Such touch input devices can include, for example, capacitive switches, infra-red touch sensors, and field effect sensors. Touch input devices can minimize many of the problems associated with mechanical switches and generally are more reliable, ergonomic and aesthetic. Also, a single touch input device can be more easily configured to selectively control several different functions.

DETAILED DESCRIPTION OF THE DRAWINGS

Figure 1:
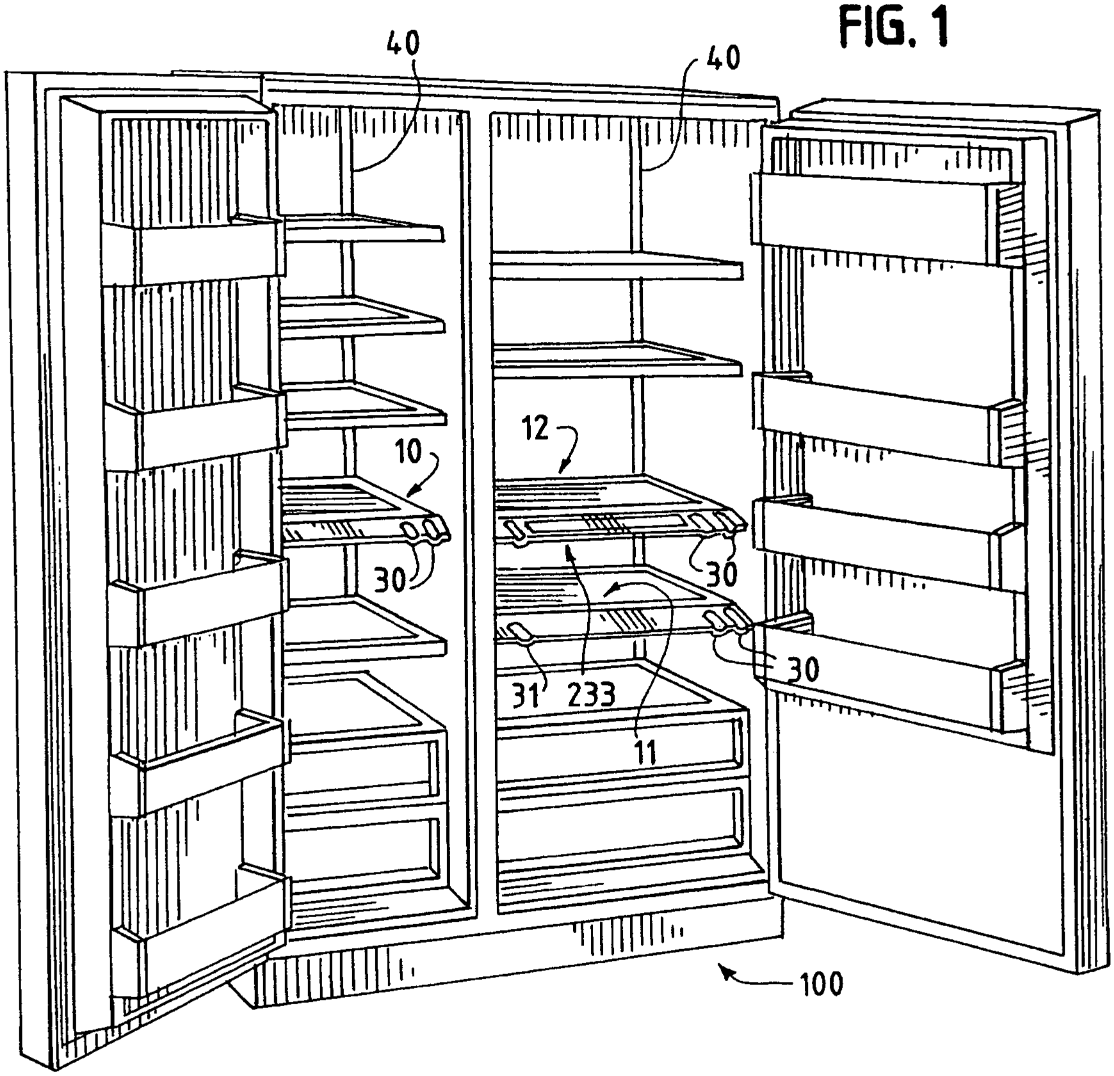
FIG. 1 illustrates a refrigerator with touch sensor-controlled adjustable shelves and an adaptive and intelligent interface according to the present invention.

While the drawings generally depict capacitive and electric field (or field effect) touch switches (or touch sensors) for the purpose of illustration, the principles of the present invention can be seen by those skilled in the art as appropriate for any manner of touch switch device, including, but not limited to, capacitive touch switches, infrared touch switches, electric field touch switches, acoustic touch switches and electromagnetic touch switches. Specific examples include the touch switches described in U.S. Pat. No. 5,594,222, No. 5,856,646, No. 6,310,611 and No. 6,320,282, each naming David W. Caldwell as inventor. The disclosures of the foregoing U.S. patents are hereby incorporated herein by reference. The disclosures of U.S. patent application Ser. Nos. 10/272,219, entitled Molded/Integrated Touch Switch/Control Panel Assembly and Method for Making Same (now U.S. Pat. No. 6,897,390), Ser. No. 10/272,377, entitled Touch Switch with Integrated Control Circuit, Ser. No. 10/272,047, entitled Touch Sensor with Integrated Decoration, and Ser. No. 10/271,438, entitled Integrated Touch Sensor and Light Apparatus, all filed on Oct. 15, 2002 and all naming David W. Caldwell as an inventor, also are hereby incorporated herein by reference.

Preferred embodiments of the present invention use touch sensors as control input devices. Touch sensors are solid state devices that respond to a user's touch or proximity. Touch sensors commonly include electrodes and electronic components mounted on a substrate. This substrate might have a user-accessible operative touch surface. Preferably, this touch surface is on the side of the substrate opposite the side that bears the touch sensor's electrodes and electronic components. In alternate embodiments, the operative touch surface can be on another substrate that is attached to or otherwise associated with the substrate bearing the touch sensor components. In either embodiment, a signal is supplied to the electrode(s), thus generating an electric field about the operative touch surface. When the electric field is disturbed by a user's touch or proximity, the touch sensor circuitry generates a control signal that can be used to control the operation of a light, motor or other end device.

Touch sensors overcome many disadvantages inherent to mechanical switches. For example, because a touch sensor's operative touch surface can be a non-perforated substrate, the touch sensor is much less susceptible to damage due to liquids and other foreign matter. Because a touch sensor has no moving parts, it is much less prone to wearing out. Because a touch sensor and its substrate can be (but need not be) substantially planar, problems related to the large profile of mechanical switches can be avoided, thus removing the design limitations that relatively large profile mechanical switches impart on the design of shelving systems and the like.

Many of the problems associated with mechanical switches, including the effects of contamination and space considerations, are particularly troublesome in shelving environments where relatively high levels of moisture or contaminants exist and where space is preferably conserved. This situation exists, for instance, in refrigerators, where moisture can condense on surfaces, where spills are likely, where food particles can be deposited on surfaces, where realizing maximum shelving space is a design goal and where the size of the overall shelving system is limited.

Use of power-operated shelves for a refrigerator is advantageous because the shelves of a refrigerator can bear numerous, disparately-sized and often unwieldy items. Shelf adjustment is therefore sometimes necessary, but difficult to achieve manually without removal of all or most of the items borne on the shelf. Use of touch switch controlled, power-operated shelves is particularly advantageous because touch switch assemblies have a low profile and, as discussed above, can prevent malfunctions owing to moisture and contaminants associated with mechanical switches that might otherwise be used in this application. The potential for malfunction of a mechanical switch due to contamination is heightened in this application because refrigerator shelves often bear liquids and foodstuffs that are prone to being spilled onto shelves and that can then drip through or around such shelves. Mechanical switches are particularly susceptible to short circuit failure under these conditions. Such malfunctions can be prevented by using touch sensors having a non-perforated touch surface substrate that can prevent liquids from reaching the touch sensor's electronic components.

FIGS. 1-4 depict an embodiment of the present invention involving a refrigerator having power-operated shelves controlled by touch sensors. FIG. 1 shows a refrigerator 100 including three power-operated shelves 10, 11 and 12 mounted on movable brackets 40, which are, in turn, connected to a suitable drive mechanism (not shown). Any suitable type of power or drive mechanism, e.g., electric, hydraulic, or pneumatic, can be used. The drive mechanism can carry brackets 40 and, in turn, shelves 10, 11 and 12 vertically up or down as desired, and can support shelves 10, 11 and 12 in a stationary position.

According to the present invention, shelves can be movably mounted in any number of configurations as required by the particular application. Expected shelf load and dimensions and cost considerations, as well as the configuration of refrigerator 100 itself, dictate which mounting configuration or drive mechanism would be most advantageous. Shelving systems according to the present invention can include conventional fixed or manually adjustable shelves in addition to one or more power operated shelves, as depicted in FIG. 1.

In the illustrated embodiments, shelves 10, 11, 12 each include two "hard keys" 30. In other embodiments, more or fewer hard keys can be used. Preferably, each hard key 30 includes an operative touch surface which can be touched by a user to actuate an underlying touch sensor. The touch sensor underlying a hard key 30, when triggered by user input, generates a control signal that controls a specific device in a predetermined manner. For example, a hard key 30 might be used to turn on a light on and off. Alternatively, a first hard key 30 might be used to cause a shelf to be raised, while another might be used to cause raise a shelf to be lowered.

In the illustrated embodiment, shelf 11 also includes "soft key" 31, each of which also includes an operative touch surface having an underlying touch sensor. Unlike a hard key 30, a soft key 31 does not necessarily control a specific device in a predetermined manner. Instead, a soft key 31 can be used to execute various control functions, for example, a function identified by a message prompt on an input/output display 233. Display 233 can display any variety of message prompts corresponding to functions that might be applicable to a particular system. A user desiring to execute the function corresponding to the message displayed on display 233 can do so by simply touching the appropriate soft key 31.

For instance, soft key 31 could serve as a confirmation key which could be used to execute a function corresponding to the message prompt when validation of a previously selected input might be required. For example, if a user tries to adjust a shelf outside predetermined limits, such as above a maximum height or to less than a minimum distance relative to another shelf, a safety mechanism might interrupt the execution of the input. In these situations input/output display 233 might prompt "Continue to raise this shelf" or simply "Continue." The user would touch soft key 31 to continue to raise the shelf. Thus, soft keys are reconfigurable and can control functions that are dependent on the state of the system and the corresponding prompt of input/output display 233.

Figure 2A:
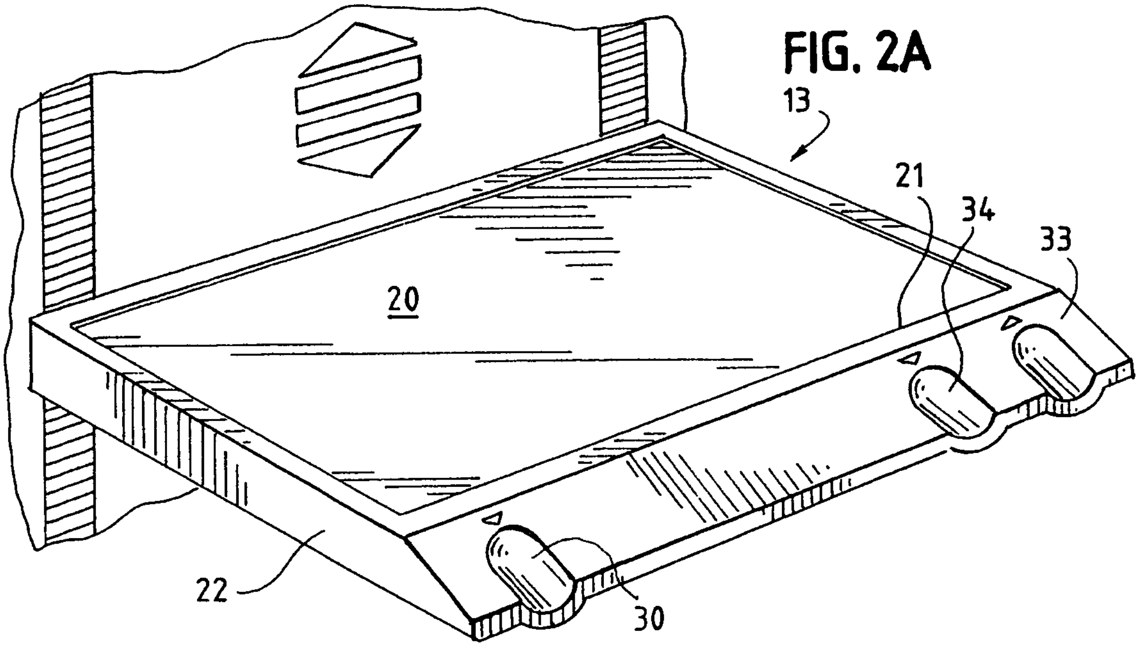
FIG. 2A is a perspective view of an adjustable shelf with touch sensor inputs for general applications according to the present invention.

In FIG. 2A, shelf 13 includes frame 22 and load surface 20. Load surface 20 can be made of glass, plastic or any other material suitable for the particular application. Shelf 13 also includes control panel 21 having hard keys 30, 33 and 34. Typically, frame 22 and load surface 20 would be fabricated as separate pieces and then joined mechanically or using adhesives. Alternatively, frame 22 could also be molded or formed onto load surface 20, with or without adhesives. In addition, control panel 21 could be an integral part of frame 22 or load surface 20, or it could be a separate subassembly. In either case, touch sensors underlying hard keys 30, 33 and 34 could be integrated into control panel 21 according to the disclosure of U.S. Provisional Patent Application Ser. No. 60/341,550, which teaches integration of touch sensors and touch switch assemblies into other components, for example, a refrigerator shelf, refrigerator door or other refrigerator component. Touch sensors could also be applied to control panel 21 in a conventional manner.

Figure 3A:
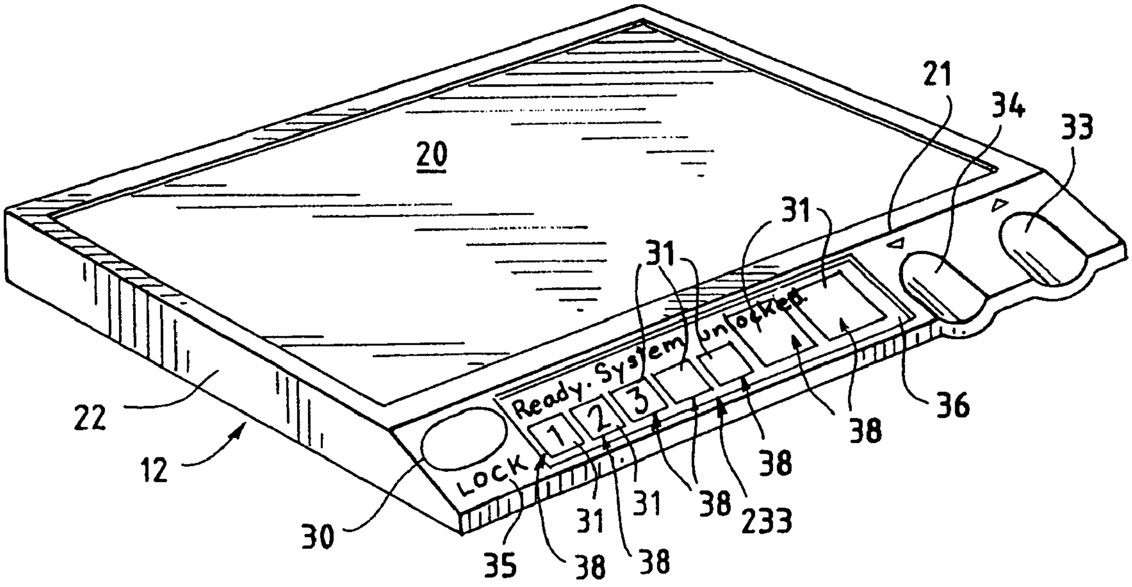
FIG. 3A is a perspective view of a shelf with an adaptive and intelligent input and output interface including touch sensors and a display according to the present invention.

User input to the hard keys of FIG. 2A can trigger the vertical movement of shelf 13 or cause some other response. For example, user input to hard key 33 can trigger the upward movement of shelf 13, while user input to hard key 34 can trigger the downward movement of shelf 13. User input to hard key 30 can trigger any other response advantageous for the particular application. For instance, as mentioned above, user input to hard key 30 could trigger a light, for example, a light pipe, that could illuminate load surface 20 of shelf 13 to facilitate location of items on shelf 13. In an embodiment, load surface 20 itself could be a light pipe or other lighting device. User input to hard key 30 could also trigger a lock/unlock response that either allows or prohibits movement of shelf 13 until a user has touched hard key 30. This can prevent unintended shelf movement caused by, for example, the user or items stored on shelf 13, triggering the touch sensors underlying hard keys 33 and 34. In FIG. 3A, lock key 35 serves the locking function, allowing hard key 30 to serve some other function, such as switching a light on or off.

Figure 2B:
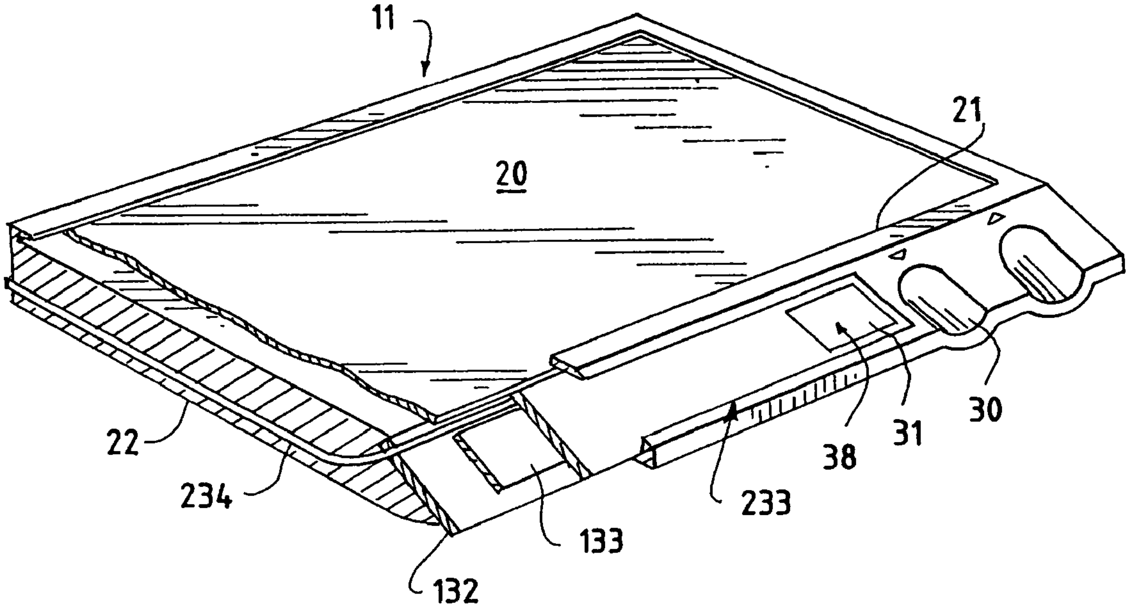
FIG. 2B is a perspective view of an adjustable shelf with an adaptive and intelligent input and output interface including touch sensors and a spill sensor incorporated into the shelf according to the present invention.

FIGS. 2B and 3A-3C depict shelf 11 of FIG. 1 in greater detail. In FIG. 2B, shelf 11 is shown including wiring harness 234, which can provide power to the display board 133 of input/output display 233, borne on substrate 132, and can carry signals to and from the touch sensors underlying hard and soft keys 30 and 31. Wiring harness 234 could also communicate a response output from the touch sensors of display board 133 in applications where the touch sensors do not include integrated control circuits proximate their electrodes. Wiring harness 234 can be molded directly into frame 22. Wiring harness 234 could also be formed by applying conductors (not shown) along the edge of load surface 20. The conductors could be applied using various methods such as screen printing of silver or copper-based frits or epoxies, electroplating or by any other suitable method. Once the conductors have been applied to the edge of load surface 20, shelf 11 can be configured so that frame 22 protects the conductors from the environment of the refrigerator. In the case where the shelf is battery powered, wiring harness 234 can be completely eliminated and the touch switch-controlled device can receive touch sensor inputs via a radio frequency transmitter-receiver system. The radio transmitters associated with the touch sensors of the shelf could also relay important system information, such as information regarding the relative positions of the shelves in the system.

Other kinds of information, status, or output devices could also be mounted on control panel 21 of shelves according to the present invention, and could be used in connection with the operation of the touch switch assemblies. For instance, lights mounted either beside or beneath operative touch surfaces could indicate either the presence of an operative touch surface or could signal to the user that an input has registered in the circuit to which the touch sensor is connected. Lights can be either LEDs, OLEDs, LEPs, light pipes, electroluminescent back-lighting, standard incandescent bulbs or any other suitable lighting, and can be configured, for example, according to the disclosure of U.S. Provisional Patent Application Ser. No. 60/341,551. Input/output display 233 can also be configured to present device information to a user, either simply as information, such as temperature or humidity levels, or as part of a message prompt soliciting a response.

Figure 3B:
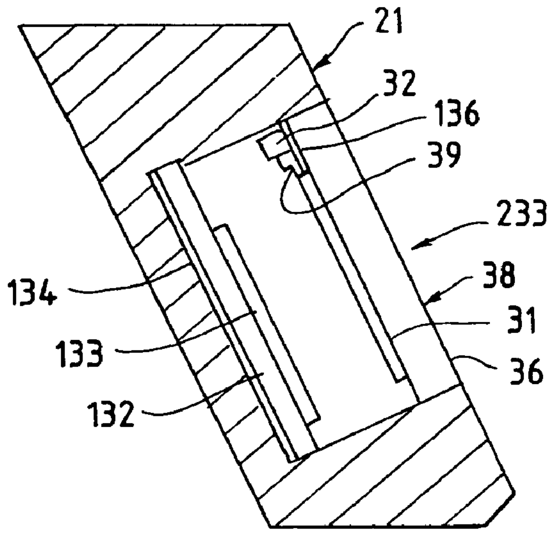
FIG. 3B is a cross-sectional side elevation view of a portion of the shelf illustrated in FIG. 3A.

An embodiment of input/output display 233 and its subcomponents is shown in detail in FIGS. 3A-B. Display board 133 is mounted on display board substrate 132 which, in turn, is affixed to control panel 21 using adhesive layer 134. Display board 133 displays messages and other information to the user. Display board 133 can be of any suitable construction depending on the requirements of the application. For instance, display board 133 could be a vacuum fluorescent display, liquid crystal display, electroluminescent display, electrophoretic display, polymer display, light emitting diode, or any other type display.

The touch switch electrical components are disposed on touch sensor substrate 36, which also defines operative touch surfaces 38. Substrate 36 is sufficiently transparent to allow a user to view messages on display board 133. In this embodiment, the touch switch electrical components include electrode 31, integrated control circuit 32 and circuit trace 39. Electrode 31 preferably is transparent to allow the message prompts of display board 133 to reach the user. Other touch sensor configurations and types are also suitable for use in connection with the present invention. For instance, control circuit 32 could be located remote from transparent electrode 31. Other types of touch sensors appropriate for use in connection with the present invention include, but are not limited to, electric field, capacitive, infra-red, differential touch sensors, or touch sensors and touch switch assemblies according to the disclosure of U.S. Provisional Patent Application Ser. No. 60/334,040.

Touch sensor substrate 36 can be decorated with decoration 136. Decoration 136 can be applied using, for example, the disclosure of U.S. Provisional Patent Application Ser. No.

60/341,551 and can be transparent and made of glass, plastic or other suitable material. In FIG. 3A, control panel 21 of shelf 12 includes hard keys 30, 33 and 34 and lock key 35 as well. Display 233 could be a separate assembly including a housing or other structure or could be integrated with control panel 21 of shelf 12 as shown in FIGS. 3A-3B. The components of display boards 133 and of touch sensors or touch switch assemblies can be either rigid or flexible, depending on the requirements of the application.

Any of the touch switches corresponding to operative touch surfaces 38 can be configured as either a hard or a soft key. For instance, the touch sensors and operative touch surfaces labeled "1"-"3" could be configured as soft keys which could be used to effect control of whatever function the soft key represents at any given time. This function typically would be represented on the portion of display board 133 underlying a particular soft key. For example, portions of display board 133 underlying the touch surfaces 38 labeled as "1"-"3" in FIG. 3A as "Y," "N," and "?," respectively, while another portion of display board 133 prompts the user whether certain action should taken. For example, display board 133 might prompt "RAISE SHELF?". In response, the user could select the touch surface 38 labeled "Y" to make the system carry out the prompted action (in this example, raising the shelf), select the touch surface 38 labeled "N" to cancel the prompted action, or select the touch surface labeled "?" to cause an information message to be displayed on display board 133.

Figure 3C:
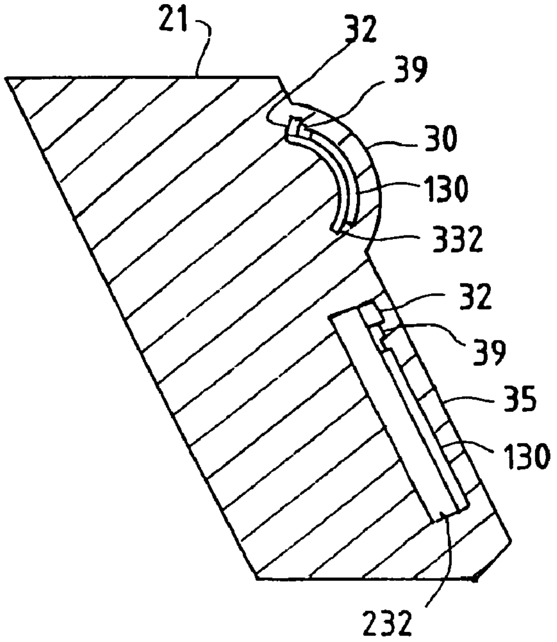
FIG. 3C is a cross-sectional side elevation view of a portion of the shelf illustrated in FIG. 3A.

Input/output display 233 can also include hard key touch sensors that can be configured to induce the vertical movement of shelf 12, or any other desired response, according to the particular design or application requirements. As shown in FIG. 3A, not all areas of display 233 need include operative touch surfaces. However, in other embodiments, it might be preferred that all areas of display 233 include operative touch surfaces. The touch sensor of lock key 35 is shown as including electrode 130, integrated control circuit 32, and circuit trace 39 disposed on touch sensor substrate 232, which is integrated into control panel 21. Since lock key 35 is shown embedded in the material of control panel 21, electrode 130 need not be a transparent electrode 31. Hard key 30 can have a similar touch sensor configuration and can conform to the surface of control panel 21, for example, according to the disclosure of U.S. Provisional Patent Application Ser. No. 60/341,550 or in some other fashion. Touch sensor substrate 332 bearing electrode 130 preferably is flexible to allow for easy conformity with the curvature of hard key 30, which is defined by the curvature of the corresponding portion of control panel 21. The particular configuration of display 233 and control panel 21 of shelf 12 is a matter of design choice. The embodiment of the present invention described with reference to FIGS. 3A-3C is merely illustrative.

In other embodiments, touch sensors and display panels could be located in places other than a shelving system's shelves. However, locating sensors and panels on the shelves themselves can advantageously prevent the confusion that might accompany a remote control panel and might obviate the otherwise needless labeling of particular touch surfaces as pertaining to particular shelves, while at the same time affording the user the flexibility of being able to control the movement or status of each shelf independently of others within the system.

Figure 4:
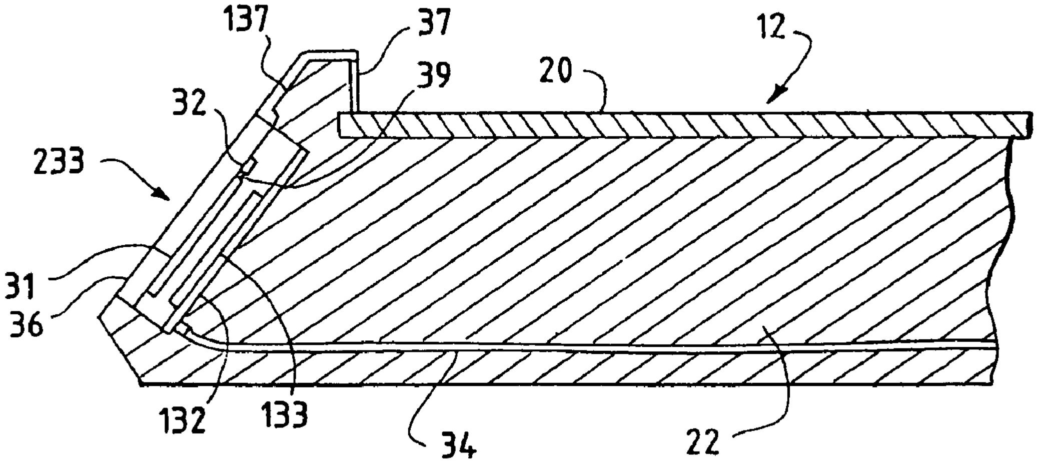
FIG. 4 is a cross-sectional side elevation view of a portion of the shelf illustrated in FIG. 2B and its spill sensor component.

FIG. 4, showing another view of the shelves of FIGS. 2A-3B, illustrates spill sensor 37. Spill sensor 37 can be an electric field sensor similar in construction to touch sensors such as those shown underlying the hard keys described herein. A touch sensor intended for use as spill sensor 37 could be designed to be especially sensitive, and need not be immune to stimulation owing to contaminants and the like. Spill sensor 37 preferably would be located where it would not likely be inadvertently touch stimulated by a user or item borne on the shelf, for instance, along the interior edge of the lip of shelf 12. Spill sensor 37, through display 233, can advantageously alert a user to the presence of a liquid spill on surface 20 of shelf 12. Spill sensor 37 can induce a specified response by shelf 12 or can prompt a message on display 233 or can activate another device within the system, such as a light or a radio transmitter, that can alert the user to the existence of a spill on a particular shelf.

As shown in FIG. 4, spill sensor 37 is connected to display 233 through connector 137. Connector 137 could be ordinary electric wire or cable or else could be a flex connector, according to the disclosure of U.S. Provisional Patent Application Ser. No. 60/341,550, that is a connected but non-integrated section of the flexible substrate bearing the touch sensors of the keys of display 233.

Other uses of touch sensors are also advantageous in shelving systems. For instance, touch or proximity sensors can be useful in configuring a shelving system that minimizes the risk of two power operated shelves coming too close together or of items on a lower shelf hitting the bottom side of a higher shelf within the system as the lower shelf is raised. To prevent this, a shelf could be equipped with touch sensors disposed on its underside. Such touch sensors could detect the encroachment of another shelf or of items borne by another shelf and signal to the shelf in motion to stop and/or reverse direction. These touch sensors could be of similar construction to those shown underlying hard keys. Such touch sensors could advantageously be designed for longer range stimulation than typical touch sensors or else could be stimulated by probes (not shown) attached to power operated shelves so as to stimulate the touch sensors before the shelf itself encroaches too close.

Figure 5:
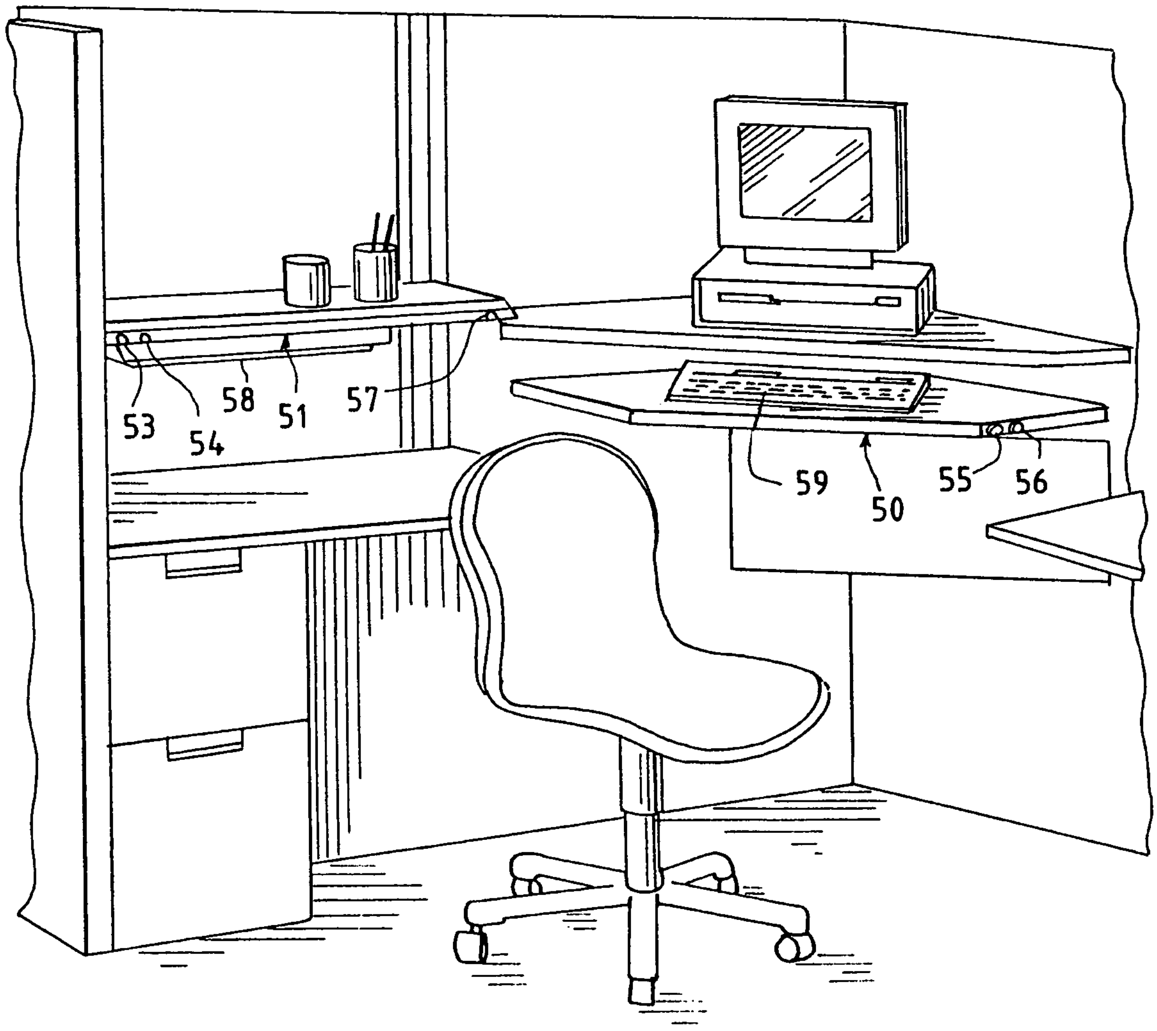
FIG. 5 illustrates an office furniture system with touch sensor-controlled adjustable shelves and an adaptive and intelligent interface according to the present invention.

Other embodiments of the present invention include the power-operated touch switch controlled shelving system of an office workspace as shown in FIG. 5. In FIG. 5, shelf 50, bearing keyboard 59, includes hard keys 55 and 56 which can control movement of shelf 50 up and down, respectively. Shelf 51 also includes hard keys 53 and 54, which can control its movement up and down, respectively. Shelf 51 also includes hard key 57, which can turn on light 58, or perform other functions. Although hard keys are shown in this embodiment, soft keys could also be used, depending on the requirements of the application, or, more particularly in this embodiment, the complexity of the workspace.

Figure 6:
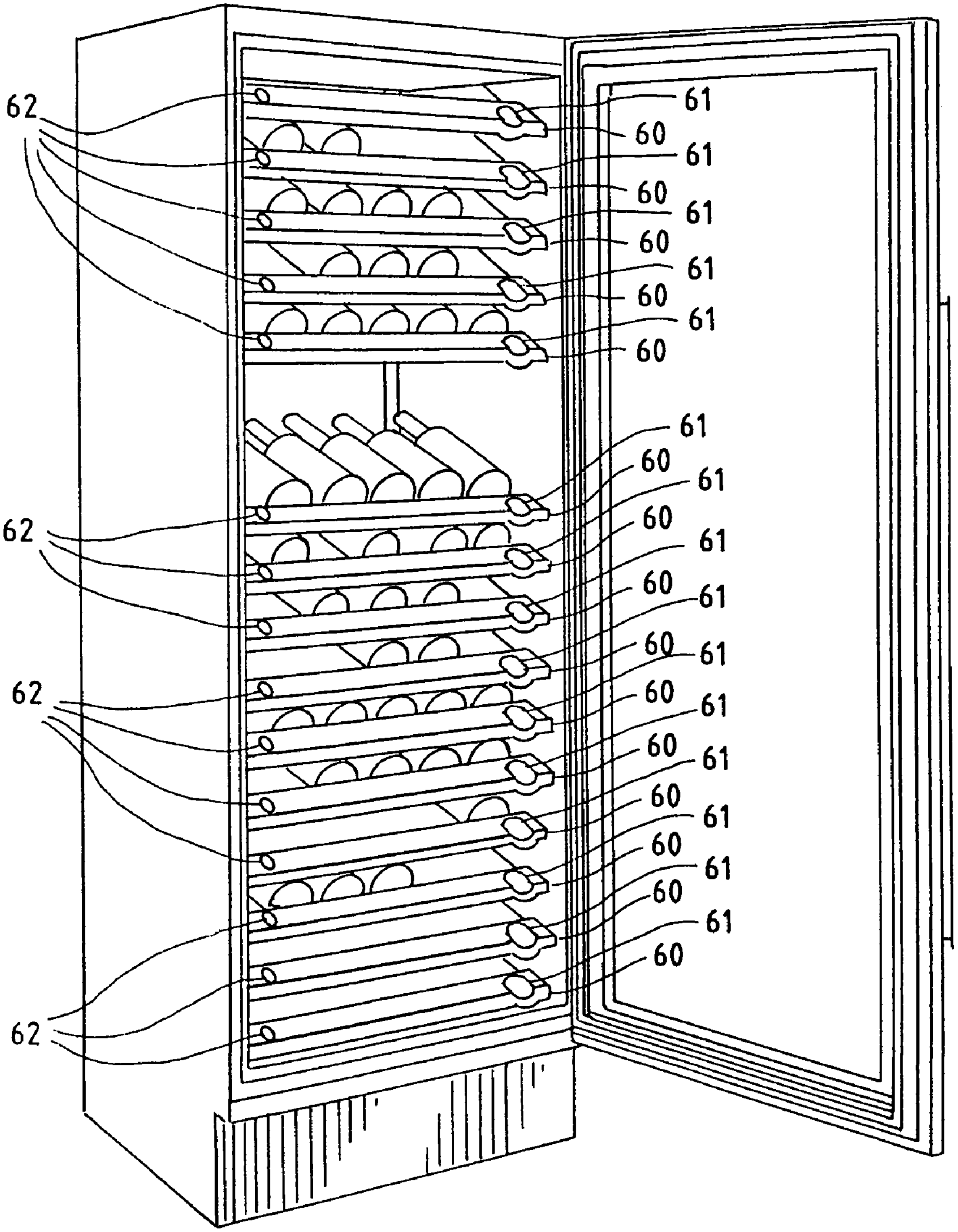
FIG. 6 illustrates a wine storage and refrigeration system with touch sensor-controlled adjustable shelves and an adaptive and intelligent interface according to the present invention.

FIG. 6 illustrates an embodiment of the present invention involving an environmental enclosure for the storage of wine bottles or other items. Adjustment of shelves 60 allows the system to maximize the use of space within the system, which not only can reduce the dimensions of the system itself, but can also more efficiently control the environment of a maximum amount of items. In FIG. 6, shelves 60 can each bear hard keys 61 and 62, which can control movement of shelves 60 up and down, respectively. In FIG. 6, the movement of one shelf 60 can advantageously also induce a response in shelves 60 that are above or below it, depending on which direction it is moved, to obviate repetitive user inputs and thereby most efficiently reconfigure the system to maximize storage space.

The problems associated with mechanical switches are particularly troublesome in power-operated adjustable shelving systems where switches are subject to repeated and often careless or aggressive use, as, for instance, where a store's display indiscriminately tempts numerous consumers, and perhaps their curious children, to activate the switches that control the movement of shelves and the items they bear. In such situations, mechanical wear owing to repeated use of the switch is a problem, unless touch switch assemblies, which can minimize mechanical wear, are used. Thus, the use of touch switch assemblies in these, and other, shelving systems can alleviate the problems of the prior art.

Figure 8:
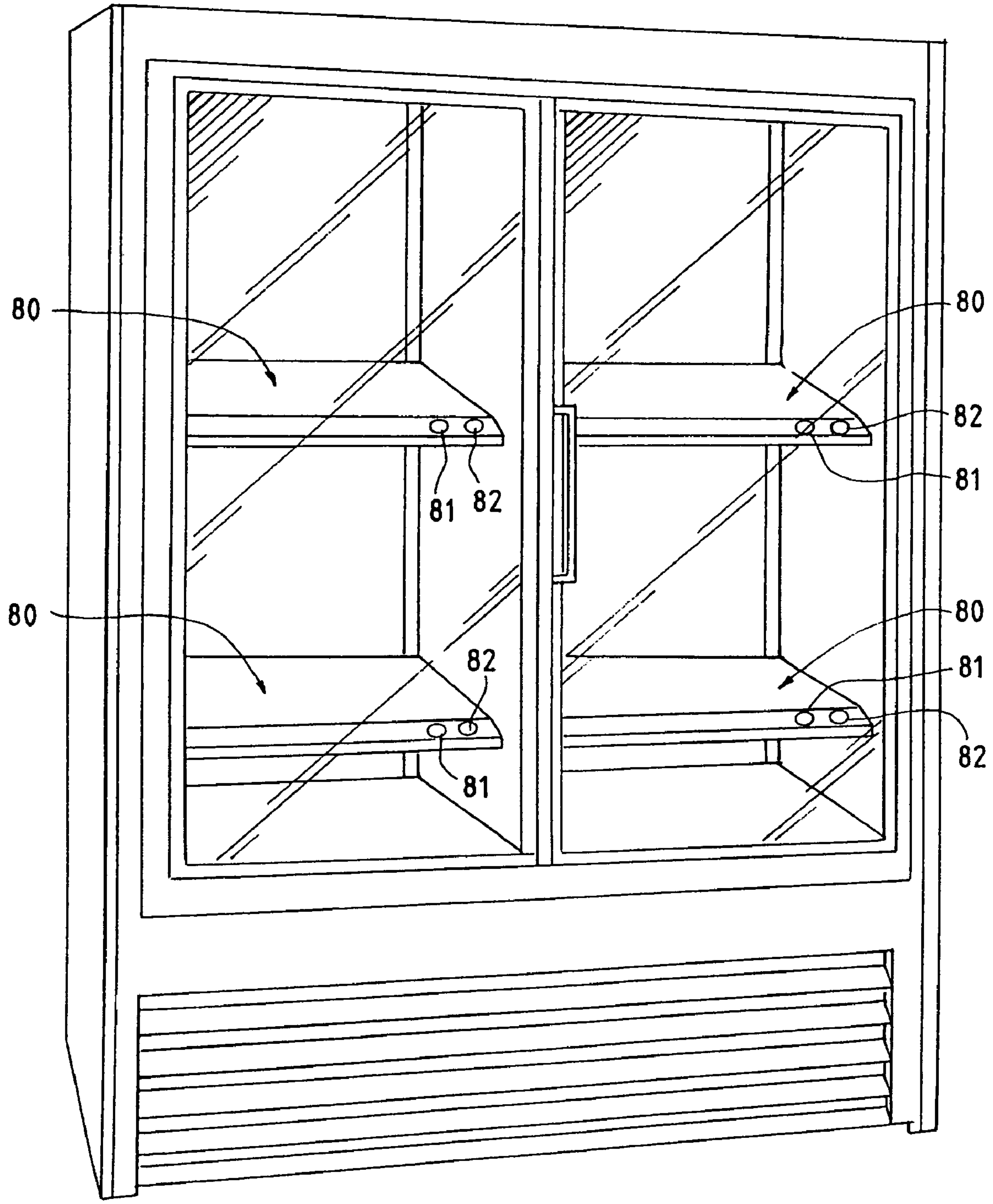
FIG. 8 illustrates a consumer goods display and storage shelving system with touch sensors according to the present invention.

FIG. 8 shows an embodiment of the present invention involving a convenience item display case which, similar to the embodiment described with reference to FIG. 6, can also involve a controlled environment. The convenience item display case of FIG. 8 is subject to the repeated use mentioned above, and is therefore especially appropriate for incorporation of the principles of the present invention. In FIG. 8, keys 81 and 82 can control the movement of shelves 80 up and down, respectively, to allow for a prospective purchaser to reach the items desired.

Figure 7:
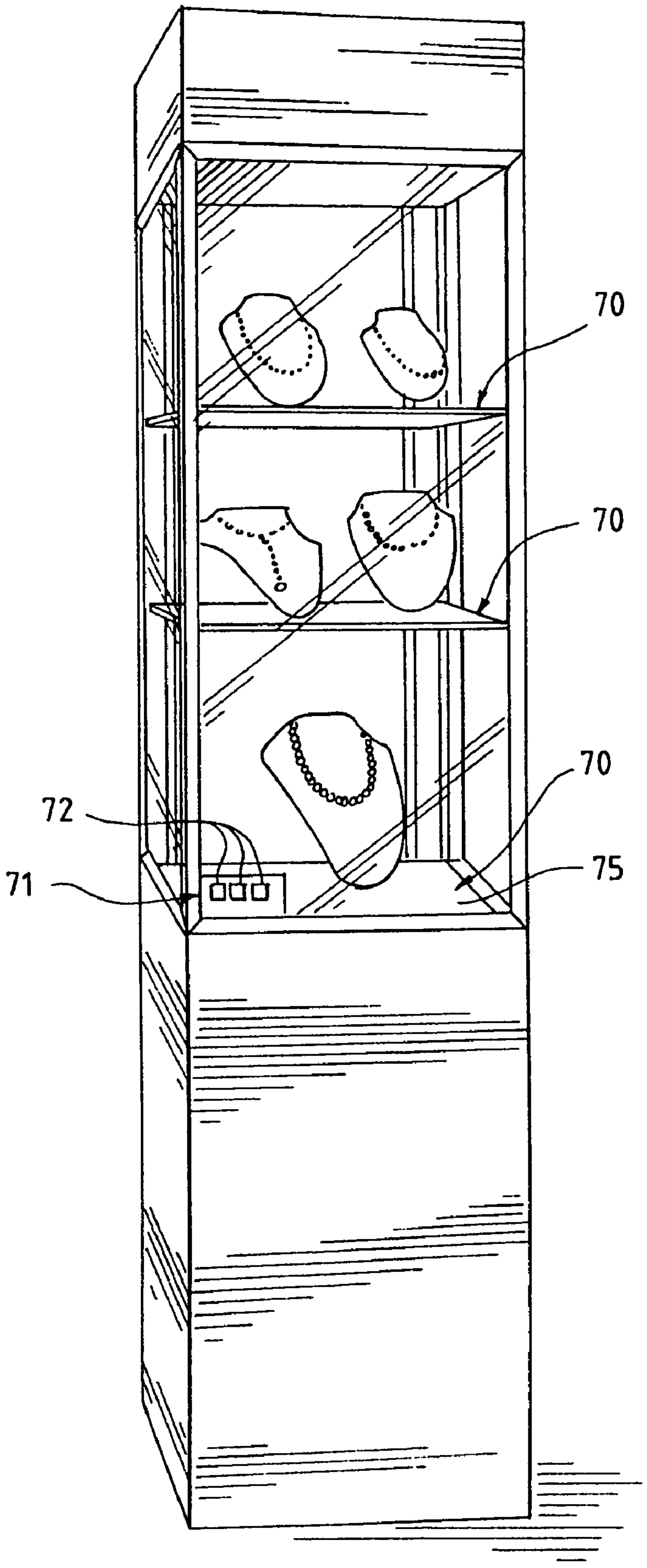
FIG. 7 illustrates a display shelving system with generally inaccessible touch sensor-controlled adjustable shelves and an adaptive and intelligent exterior control interface according to the present invention.

Sometimes the items a shelving system must display are such as to require that direct access to the shelf is not feasible. This is the case, for instance, where the display items must be environmentally controlled, or where the items are especially valuable or fragile. The embodiment of the present invention depicted in FIG. 7 addresses this situation. FIG. 7 depicts a jewelry display case with power operated touch switch controlled shelves 70. In this embodiment, display 71 includes touch sensors 72 underlying glass panel 75. Touch sensors 72 are effectively connected to shelves 70 and can respond to user input through the interface of display 71. This embodiment of the present invention can involve the display 233 of FIGS. 1-3 and can therefore also involve touch sensors 72 corresponding to either hard or soft keys.

Display 233 depicted in FIGS. 3A-3B could also play a role in consumer item displays of the sort depicted in FIGS. 7-8. In consumer item display systems, as well as warehousing and other storage or display shelving systems, there often exists a natural relationship between the shelf and the items borne by the shelf. That is, shelving systems are sometimes advantageously designed so that a particular shelf bears a particular type of item, such as canned soup, ice cream, clothing or lumber. Such shelves often include hard copy descriptions of the items they bear, including UPC bar codes, product identification names and numbers and pricing information, to assist the user in finding a desired item or comparing items from different shelves within the system. This, and other, information could be presented to the user according to the present invention through an interface similar to the interface of display 233, which could be configured to allow the user to scroll through information about the shelf or items thereon and make selections or comparisons of the information presented. To conserve space and minimize the size of display 233 in these applications, display 233 could advantageously involve touch sensors, such as capacitive, field effect, infrared, or other suitable touch sensors, as described above, but could, in addition, also involve standard input switches including mechanical or membrane switches.

Various other features can be incorporated with shelving systems according to the present invention. For instance, the display can be used to provide information relating to one or more characteristics of items stored on the shelf, such as a description of the items, their size and price, the quantity of items stored on the shelf, and so on. In one embodiment, this information can be derived from data transmitted from devices such as RF ID tags (not shown) associated with the stored items to a receiver associated with the shelving system, as would be known to one skilled in the art. To conserve energy, the display could be activated by proximity sensors (not shown) responsive to a consumer's approach or according to some other input. For example, these sensors could cause the display to be activated or cause to be displayed thereon certain information when a potential consumer approaches the shelving system or otherwise provides an input to one or more touch sensors associated with the shelving system. This feature, i.e., the selective activation of displays, can also prove advantageous in other embodiments of the present invention. For instance, individual shelves or their displays could be proximity activated, or could include an activation key to turn on the display when touched. In all embodiments, information to be displayed can come from a location remote from the system or can be provided by sensors or other devices proximate or integral to the system.

Figure 9:
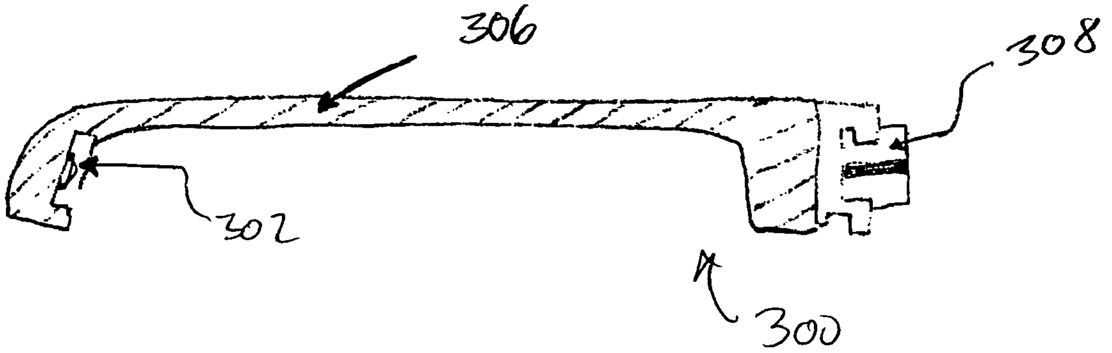
FIG. 9 is a cross-sectional side elevation view of a shelf having encapsulated lighting according to the present invention.
Figure 10:
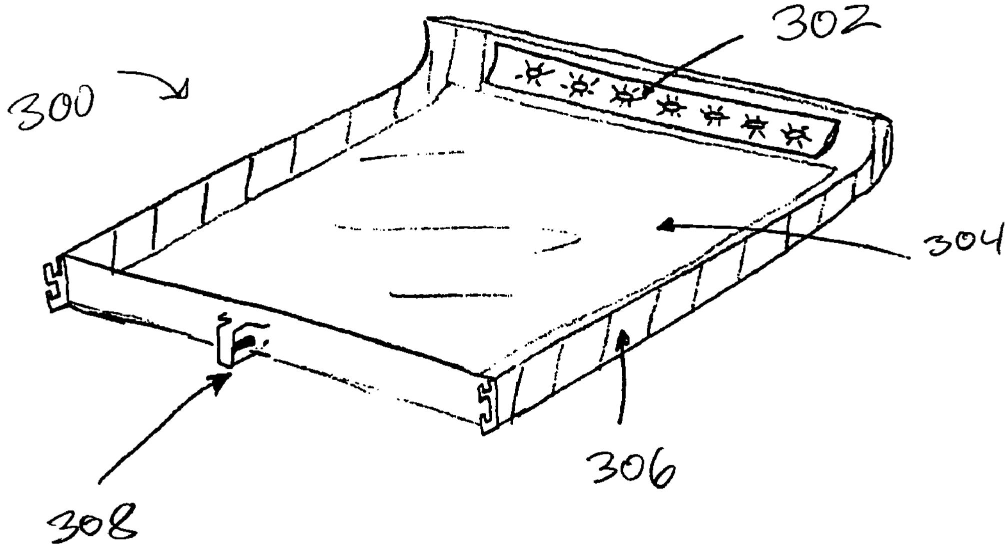
FIG. 10 is a bottom perspective view of a shelf having encapsulated lighting according to the present invention.

FIGS. 9 and 10 illustrate an embodiment of the present invention involving a shelf 300 having a built-in light source 302. In a preferred embodiment, shelf 300 includes a glass load surface 304 encapsulated in a polymer frame 306. Light source 302 is integrated with shelf 300 using, for example, a suitable encapsulation technique that would be known to one skilled in the art or one of the techniques disclosed in U.S. Pat. No. 6,897,390, the disclosure of which is incorporated herein by reference. Light source 302 can include one or more individual light sources, for example, LEDs, OLEDs, PLEDs, incandescent sources, etc. Frame 306 preferably includes an electrical connector 308 that receives power from a power bus (not shown) operably associated with shelf 300. Preferably, power is delivered from connector 304 to light source 302 via a wiring harness molded into frame 306 (such as wiring harness 234 illustrated in FIG. 2B) or via conductors printed directly onto glass portion 302 of shelf 300 and overmolded by frame 306. Preferably, light source 302 and the foregoing means for delivering power from electrical connector 308 to light source 302 encapsulate these components such that shelf 300 could be completely submerged in liquid without damage to light source 302. In this manner, light source 302 and the means for delivering power to it are highly impervious to contamination by liquids and to harsh environments in general, for example, the environment inside a refrigerator.

The preceding drawings and descriptions serve to illustrate, but neither limit nor exhaust, the principles of the present invention. Various alterations to the embodiments described above are in keeping with the spirit of the invention and will be understood by those skilled in the art to be a part of the present invention as claimed below.

We claim:

1. A shelving system comprising:

a shelf;

a touch sensor integrated into said shelf; and a control circuit having an input section and an output section, said touch sensor coupled to said input section of said control circuit;

wherein said touch sensor provides an input signal to said control circuit, said input signal being indicative of touch of or proximity to said touch sensor and said input signal being associated with control of a predetermined local function of said shelving system.

2. The shelving system of claim 1 wherein said input signal is selectively associated with one or more of a plurality of predetermined local functions of said shelving system.

3. The shelving system of claim 1 further comprising at least one conductive trace disposed on said shelf, said at least one conductive trace coupled to said control circuit.

4. The shelving system of claim 3, said shelf comprising a load surface, said at least one conductive trace disposed on said load surface.

5. The shelving system of claim 4 wherein said load surface is glass.

6. The shelving system of claim 4, said shelf further comprising a frame substantially surrounding said load surface, said frame overlying said at least one conductive trace.

7. The shelving system of claim 1 further comprising a wiring harness associated with said shelf, said wiring harness coupling said touch sensor to said control circuit.

8. The shelving system of claim 7, said wiring harness integrated with said shelf.

9. The shelving system of claim 8, said shelf comprising a load surface and a frame, said wiring harness integrated with said frame.

10. The shelving system of claim 1 further comprising a second shelf, wherein said touch sensor is configured to sense proximity of said second shelf or an item borne on said second shelf.

11. The shelving system of claim 1 wherein said touch sensor is configured to sense the presence of liquid on said shelf.

12. The shelving system of claim 11 further comprising a user feedback device operably associated with said touch sensor such that said user feedback device provides user feedback indicative of said presence of liquid on said shelf.

13. The shelving system of claim 1, said shelf further comprising a user feedback device integrated into said shelf.

14. The shelving system of claim 13 wherein said user feedback device comprises a display.

15. The shelving system of claim 13 wherein said user feedback device comprises an indicator.

16. The shelving system of claim 15 wherein said indicator comprises a light emitting device.

17. The shelving system of claim 13 wherein said user feedback device comprises an audio device.

18. The shelving system of claim 1 further comprising a transmitter and receiver system coupled to said control circuit, said transmitter and receiver system adapted to communicate information concerning one or more items borne on said shelf.

19. The shelving system of claim 18 further comprising a display in communication with said transmitter and receiver system, said display adapted to provide visual information concerning said one or more items borne on said shelf.

20. A shelving system comprising:

a shelf;

a display integrated into said shelf;

a control circuit coupled to said display; and a touch sensor, said touch sensor overlying at least a portion of said display.

21. The shelving system of claim 20, said touch sensor being sufficiently transparent such that said display is legible to a viewer.

* * * * *